May 2, 1961 P. S. YOST 2,982,049
FISH HOOK BAIT SECURING MEANS
Filed May 1, 1957

INVENTOR.
PAUL S. YOST
BY
ATTORNEY

United States Patent Office 2,982,049
Patented May 2, 1961

2,982,049

FISH HOOK BAIT SECURING MEANS

Paul S. Yost, 883 Cambridge Road, Cleveland Heights 22, Ohio, assignor, by decree of distribution, to Dorothy Deeds Yost Filed May 1, 1957, Ser. No. 656,411

3 Claims. (Cl. 43—44.4)

This invention relates to a fish hook and bait securing means therefor.

Fishermen encounter great difficulty in attaching live bait to a fish hook without immediately rendering the bait lifeless or injuring the bait so seriously that it will live for only a short time after being attached to the hook.

Even if the bait is successfully attached to the hook without serious injury, devices heretofore known have confined the live bait to such a great degree that the minnow or other bait has no freedom of movement in the water thus greatly decreasing the attractiveness to surrounding fish.

It is an object of this invention to provide a fish hook and bait attaching means which does not injure the live bait and tightly secures the bait to prevent easy removal.

A further object is to provide a bait securing means which allows a great degree of freedom of movement of the live bait to insure that a live lure is provided.

Still another object is to provide a bait attaching means which can be adjusted to different size bait without any material alteration of the bait attaching means.

Yet another object is to provide bait attaching means which is readily attached to any type standard hook.

These and other objects and advantages will become apparent from the following description in which reference is made to the drawing and wherein.

Figures 1, 2:
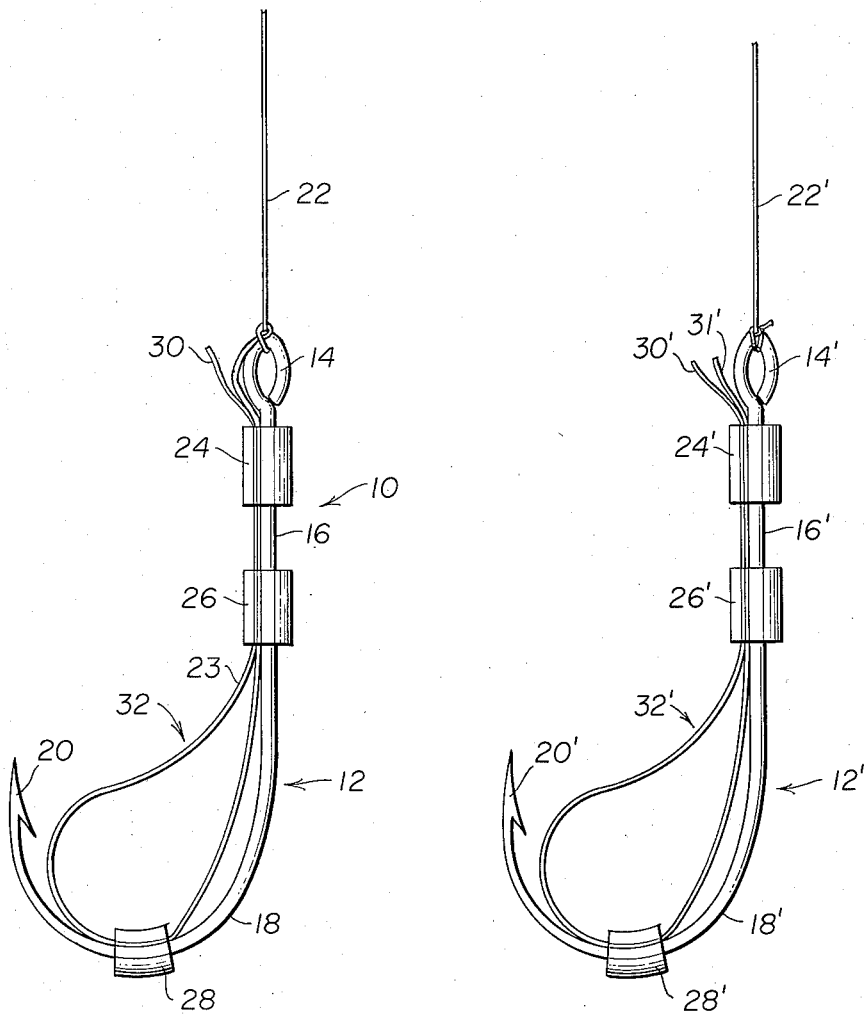
Figure 1 illustrates a fish hook and novel bait securing means.
Figure 2 is a modification of the novel bait securing means.

Briefly, the invention is comprised of a conventional single or multiple barb hook having an eye or similar attaching means for a leader or line. A pluraility of sleeves or short pieces of plastic tubing or similar material are passed over the barbs and suitably positioned on the shank of the hook and at a position near the barbs. A piece of line, preferably transparent monofilament leader material, is passed between the tubing on the shank portion and the tubing near the barbs and then back through the tubing on the shank portion to form a loop near the curved portion of the hook. One end of the line or leader is secured to the eye portion of the hook and the other end remains free as shown in Fig. 1 or both ends can be free as shown in Fig. 2.

A minnow or other live bait is then partially inserted in the loop portion of the line or leader and the piece of tubing on the lower portion of the hook shank is moved to a lower position until the bait is held securely in the loop. Due to the tight fit between the tubing and the hook body, the tubing will remain in the adjusted position, thus insuring that the bait is securely held and yet has a great degree of freedom of movement. When a fish strikes and the hook is set, the weight of the fish is carried by that portion of the leader which is above the knot at the eye of the hook and therefore the bait securing means remains relatively undisturbed.

Referring to Fig. 1 of the drawing for a more detailed description of the device, a combination hook and bait securing means 10 is provided with a hook 12 having an eye portion 14, a shank portion 16, a curved portion 18 and a barb 20. It is to be understood that any conventional hook can be used and it is immaterial whether there is a single barb or a plurality of barbs.

A leader or line 22 is attached by a swivel or other suitable means to a line which is in turn attached to a reel or other means mounted on a rod or pole. These conventional devices are not illustrated and for the purpose of simplicity, only the lower portion of leader 22 is shown. The leader is preferably of a transparent, mono-filament material but can be made of other suitable substances since the novelty of the present invention does not lie in the specific material used.

Leader 22 is suitably attached to eye 14 of hook 12 by a knot or other suitable securing means with a free length of leader material 23 over twice the length of the shank of the hook disposed below the knot.

Suitable sleeves or pieces of tubing material 24, 26 and 28 are passed over the barb 20 and are positioned approximately as shown. These tubes are preferably formed of transparent, plastic material which is resilient enough to pass over the barbs of the hook and yet tightly grip the body of the hook so that they will remain in a selected position.

The end 30 of leader length 23 is then passed between tubes 24, 26, and 28 and the shank and curved portions respectively from the eye toward the curved portion 18 of hook 12 and then back between tubes 26 and 24 and the shank portion from the curved portion 18 toward eye 14, thus forming a loop 32. If necessary, a suitable threading means can be temporarily attached to leader end 30 to aid in passing the leader through the tubes or a suitable tool means can be used to laterally stretch the tubes to allow easy passage of the leader through the tubes. Such elements are obvious expedients and form no part of the present invention.

When it is desired to attach a minnow or other live bait to the securing means, the bait is inserted part way through loop 32, and tube 26 is manually lowered on the shank of the hook until loop 32 is disposed tightly around the bait and securely confines it. Because of the tight fit between the tubes and the body of the hook, tubes 26 and 28 will remain in the selected positions and leader 23 cannot shift longitudinally due to the tight fit. It is obvious that the bait is not injured when attached in this manner and it still has a great degree of freedom of movement, thus attracting the fish.

It is to be noted that tube 24 could be dispensed with but it has been determined that this additional tube provides another means to insure that the loop will not slip due to any longitudinal movement of leader 23 and it also prevents free end 30 from dangling free in the water.

A modification of the novel bait securing means is shown in Fig. 2 of the drawing. A hook 12' is comprised of an eye portion 14', a shank portion 16', a curved portion 18' and a barb 20'. A pluraility of tubes 24', 26' and 28' are positioned in a manner similar to that shown in Fig. 1.

A suitable length of leader or line material 32' is disposed in a manner similar to that described in Fig. 1 but in this modification, line 32' is separate from leader 22' and is provided with two free ends 30' and 31'. With this arrangement, the novel securing means can be applied to a hook 12' and a leader 22' which is attached in a conventional nature.

Although the preferred embodiments of this invention have been shown and described, it is understood that the foregoing description is merely exemplary, and that the concept of this invention is susceptible of numerous other modifications, variations, and applications which will be apparent to persons skilled in the art. The invention is to be limited, therefore, only by the broad scope of the appended claims.

I claim:

1. A device of the class described comprising a hook means having a shank portion and a curved portion, a first flexible sleeve means telescoped tightly over said shank portion, a second flexible sleeve means telescoped tightly over said curved portion, line means passing between said first sleeve means and said shank portion and between said second sleeve means and said curved portion and back between said first sleeve means and said shank portion whereby said line means is frictionally held in the form of a loop portion by the resilient gripping action of said sleeve means, and said first sleeve means being adjustably disposed on said shank portion to adjust the size of said loop portion.

2. A device of the class described comprising a fish hook including eye means, a shank portion and a curved portion, a pair of resilient sleeve means tightly telescoping respectively the shank and curved portions, and line means threaded between the sleeve means and shank and curved portions and providing a loop between the sleeve means.

3. A device according to claim 2 wherein the line means extends in single strand relation in a continuous path between the sleeve means on the shank portion and the shank portion, between the sleeve means on the curved portion and the curved portion and looped back between the sleeve means on the shank portion and the shank portion.

References Cited in the file of this patent

UNITED STATES PATENTS

| | | |
|---|---|---|
| 615,170 | Henckler | Nov. 29, 1898 |
| 911,040 | Hickey | Feb. 2, 1909 |
| 1,613,113 | Leu | Jan. 4, 1927 |
| 2,143,054 | Copeland | Jan. 10, 1939 |
| 2,732,652 | Parks | Jan. 31, 1956 |